A. JENSEN.
REGENERATOR.
APPLICATION FILED MAR. 15, 1911. RENEWED JUNE 10, 1913.
1,073,989.
Patented Sept. 23, 1913.
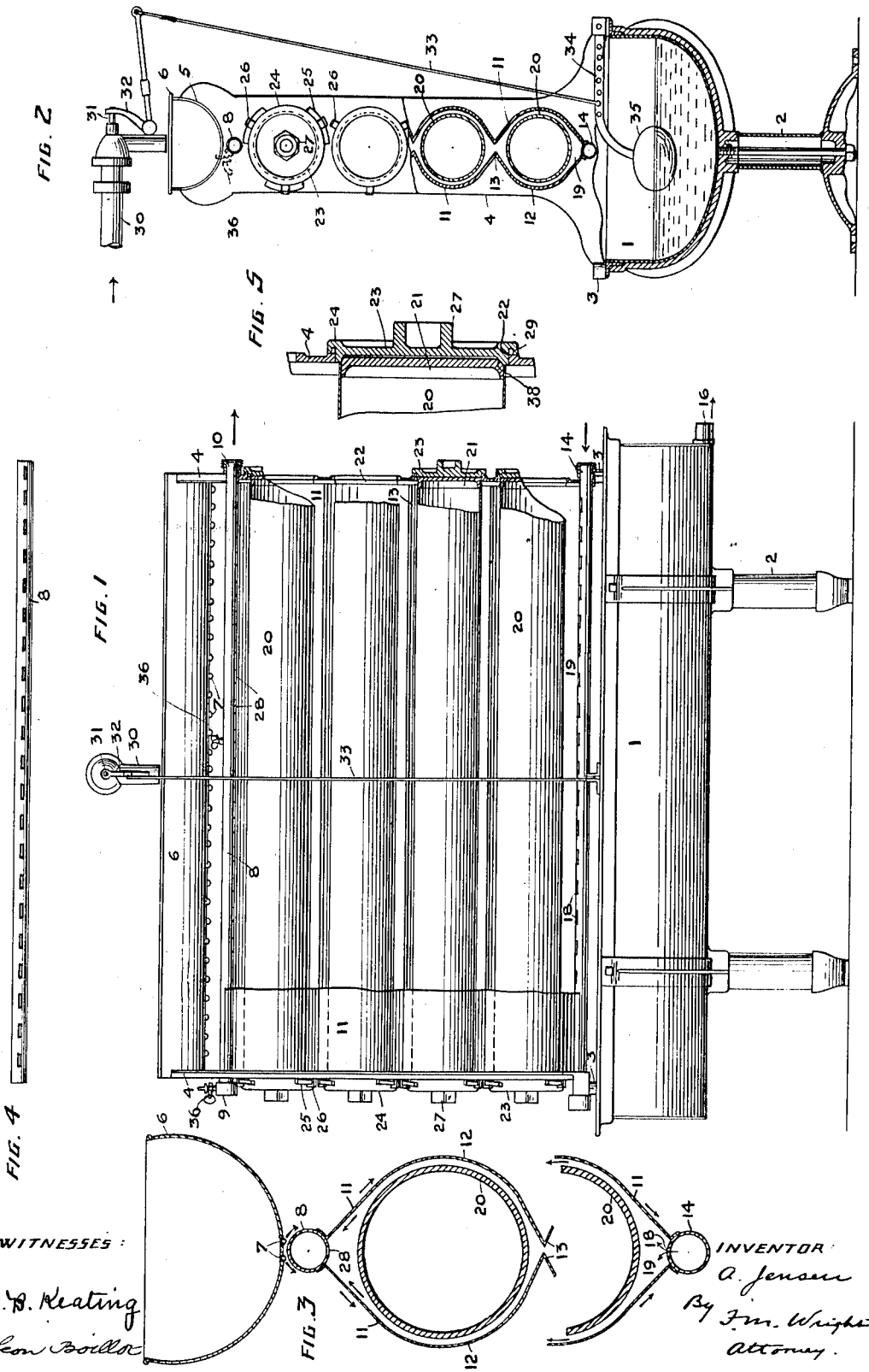

UNITED STATES PATENT OFFICE.

AAGE JENSEN, OF OAKLAND, CALIFORNIA.

REGENERATOR.

1,073,989.  Specification of Letters Patent.  Patented Sept. 23, 1913.

Application filed March 15, 1911, Serial No. 614,531.  Renewed June 10, 1913.  Serial No. 772,913.

*To all whom it may concern:*

Be it known that I, AAGE JENSEN, a citizen of the United States, residing at Oakland, in the county of Alameda and State of California, have invented new and useful Improvements in Regenerators, of which the following is a specification.

The present invention relates to improvements in regenerators for reducing the cost of heating liquids.

One object of the invention is to provide a regenerator, or heat interchanger for use in combination with a heating or pasteurizing apparatus in which, after the liquid has been heated or pasteurized, it is not again exposed to the air. It is found that the action of the oxygen in the air on the butter fat in milk or cream, while in a heated condition, has the effect of oxidizing said butter fat, causing the same to become more or less rancid. In my improved regenerator this result is not possible.

A further object is to provide a regenerator which will be very economical of heat.

A further object is to provide one which can be quickly taken down to be cleaned and does not present any inaccessible crevices or corners, which render it difficult to clean.

In the accompanying drawing, Figure 1 is a broken front view of the regenerator; Fig. 2 is a broken end view of the same; Fig. 3 is a cross section of the same; Fig. 4 is a bottom plan view of an upper tube and Fig. 5 is an enlarged vertical section through one of the uprights, showing therein the end of a drum and a cover for said end.

Referring to the drawing, 1 indicates a trough supported upon legs 2. Upon the sides of said trough near its ends uprights 4 are secured by standards 3. Said uprights are formed at the top with semi-circular recesses 5, in which are supported the ends of an upper trough 6, in which trough is placed the liquid to be heated by the regenerator before being supplied to a heating device (not shown). From said trough the liquid flows through minute holes 7 arranged in two longitudinal parallel rows, and from these holes the liquid descends in thin films upon opposite sides of a tube 8, the ends 9, 10, of which are secured in holes in the uprights, and one end 9 of which is capped, the other end 10 being adapted to be connected with a suitable pipe or conduit for conducting the liquid from the regenerator. From the outer surfaces of the sides of said tube 8, the liquid flows in two thin films on the outer surfaces of two casings 11, secured at their upwardly extending edges to the uprights 4, each of which casings is formed of thin sheet metal bent into the form of a series of outwardly convex cylindrical portions 12 alternating with inwardly directed angular portions 13, said angular portions, of the two casings, approaching to within a short distance of each other, while the outwardly-convex portions together form approximately a cylinder. Said films of liquid descend over the outer surfaces of the convex portions in succession and on to the outer surfaces of opposite sides of a tube 14, with which the lower edges of the casings 11 are connected. From said tube 4 they fall into the trough 1. From said trough the liquid is led, by a pipe connecting with an outlet 16, to the heating device herein before mentioned. From the heater the liquid returns to the regenerator and enters one end of the tube 14, which is closed at the other end. From said tube 14 the hot liquid escapes by slotted holes 18 in its upper side into a chamber 19 formed by the two casings 11, said uprights 4, and the upper and lower tubes 8 and 14. In said chamber 19 the hot liquid flows upwardly around a vertical series of cylindrical drums or tubes 20, permanently closed at the ends by heads 21, having beveled edges 38 (Fig. 5) said ends being contained in circular openings 22 in the uprights 4, and being there held by means of covers 23. Each cover is formed with an internally beveled flange 24, which surrounds and holds the corresponding head 21 and with a series of wedges 25, adapted in a well known manner to engage the under sides of overhanging lugs 26 on the upright, so that when said disks are turned, as by means of a wrench applied to a central boss 27, said covers are firmly secured to said uprights. Each cover has a rubber ring 29 to produce a sealed joint. This construction permits of the drums being easily removed to clean their outer surfaces and the inner surfaces of the casings 11. The radius of each drum is only slightly less than that of the convexly-curved portions 12, so that the liquid flows in thin streams between the hot outside of said drums and said casings. By these paths it flows upwardly and enters the upper tube 8 by slotted holes 28 formed in the under side of said tube, and from said tube it is conducted by a suitable conduit to any place desired.

It will be observed that, by means of the above construction, after the liquid has been heated by the before-mentioned pasteurizer or other heating device, it is not again exposed to the air, and thus there is no danger of oxidization of the butter fat.

For cleaning the apparatus it is only necessary to remove the covers 23 at the ends of the regenerator, whereupon the drums 20 can be removed, and the outer surfaces of the drums and the inner and outer surfaces of the casing can be readily cleaned, since said surfaces contain no crevices or corners which are inaccessible.

The liquid may be fed into the upper trough by means of a pipe 30, regulated in any suitable manner, as by a float valve, the stem 31 of which is automatically controlled by an arm 32 of a bell crank lever, the other arm of which is connected by a link 33 with a pivoted arm 34 connected to a float 35 in the trough 1.

An air cock 36 is provided for the purpose of letting out all gases and air when the flow of liquid is started through the regenerator, as, otherwise, it is found that an air lock is produced. The draining connections consist of a three-way valve (not shown) placed on line with the lower inlet.

I claim:—

1. A heat interchanger comprising a pair of uprights formed with similarly located vertical series of apertures, metal casings between said uprights the edges of which are secured to the inner sides of said uprights, close to, and around said apertures, inner tubes between the casings each slidable through an aperture in either upright, covers engaging the ends of said tubes and supporting said tubes, means secured upon the outer sides of said uprights for securing said covers in place, means for discharging a liquid upon the outer sides of said casings, and means for conducting a fluid between said casings and said tubes.

2. A heat interchanger comprising uprights formed with similarly located vertical series of circular apertures, casings the ends of which are secured to the inner sides of said uprights close to, and around said apertures, cylindrical drums, each sildable through an aperture in either upright, unitary means for closing each aperture and supporting an adjacent end of a drum, means for discharging a liquid upon the outer sides of said casings, and means for conducting a fluid between said casings and said drums.

3. A heat interchanger comprising uprights formed with similarly located vertical series of circular apertures, casings the ends of which are secured to the inner sides of said uprights close to, and around said apertures, cylindrical drums, each slidable through an aperture in either upright, covers for the respective apertures provided with means for supporting said drums, and means whereby said covers can be secured to said uprights to make fluid tight closures of said apertures.

4. A heat interchanger comprising uprights formed with similarly located vertical series of circular apertures, casings, the ends of which are secured to the inner sides of said uprights close to and around said apertures, horizontal cylindrical drums having closed ends, each slidable through an aperture in either upright, covers having parts arranged to engage the ends of the drums, and elements secured upon the outer sides of the uprights for supporting said covers, said covers and element being formed with co-engaging parts adapted, in the rotation of the covers, to press said covers firmly against said uprights and tightly close said apertures, means for discharging a liquid upon the outer sides of said casings, and means for conducting a fluid between said casings and said drums.

5. A heat interchanger comprising uprights formed with similarly located vertical series of circular apertures, casings, the ends of which are secured to the inner sides of said uprights close to and around said apertures, horizontal cylindrical drums having closed ends, each slidable through an aperture in either upright, covers having parts arranged to engage the ends of the drums, said uprights being provided with lugs, and the covers having wedges engaging said lugs adapted, in the rotation of said covers, to wedge the covers firmly against the uprights, and tightly close said apertures.

In testimony whereof I have hereunto set my hand in the presence of two subscribing witnesses.

AAGE JENSEN.

Witnesses:
   FRANCIS M. WRIGHT,
   D. B. RICHARDS.